Patented Aug. 3, 1937

2,088,726

UNITED STATES PATENT OFFICE 2,088,726

AZO DYE

Wilfred Archibald Sexton, Manchester, England, assignor to Imperial Chemical Industries Limited, a corporation of Great Britain No Drawing. Application January 11, 1935, Serial No. 1,385. In Great Britain January 16, 1934

3 Claims. (Cl. 260—95)

This invention relates to azo dyes, to new intermediates for azo dyes, to new compositions of matter, and to the processes by which the dyestuffs, the intermediates, and the new compositions of matter may be made. The present invention relates to the manufacture of new coupling components for insoluble azo colours and the application of these coupling components in the production of insoluble azo colours in substance or on the fibre.

It is the object of this invention to produce azo dyes of superior quality, which have a higher affinity for those substances which, like cotton, are dyed by the "direct cotton" dyes, which waste less of the dyestuff in the dyeing or printing processes, and which yield colors which are faster to rubbing and freer from loosely adhering coloring matter. Another object of the invention is to produce new intermediates which, when combined with typical azo components (the diazotized primary arylamines), produce dyestuffs having superior qualities.

The objects of the inventions are accomplished, generally speaking, by the manufacture and use of p-aroylamino-arylamides of 2,3-hydroxynaphthoic-acids which are new compositions of matter and are new intermediates and which, when combined in the usual way with a diazotized arylamine, form dyestuffs having superior qualities.

We have found that p-aroylaminoarylamides of 2,3-hydroxynaphthoic acids, which are new chemical compounds, may be applied from aqueous solutions of their soluble salts in the manner usual for coupling components for insoluble azo colours, and that they show excellent affinity for cotton in that a high proportion of the compound is taken up by the fibre. We have found, in fact, that they show better affinity than any other 2,3-hydroxynaphthoic arylamides on the market.

These new products may be coupled with the usual diazotized amines on the fibre in known manner, both components being free from solubilizing groups other than the hydroxyl group already mentioned, to give colours which have good fastness to chlorine and also good fastness to light, being in this latter respect rarely below 4–5 on the 1–8 scale and sometimes as high as 6 or 7. (See Verfahren Normen und Typen für die Prüfung der Echtheitseigenschaften von Färbungen auf Baumwolle, Wolle, Seide, Viscosekunsteide and Azetätzeide. Heraugsgegeben von der "Echtheitskommission" der Fachgruppe für Chemie der Farben- und Textilindistrie im Verein Deutscher Chemiker. Vierte Ausgabe. 1928. Verlag Chemic, C. m. b. H., Berlin. W 10.)

The high affinity of the new products permits less waste of material in the dyeing and printing process and gives dyeings and prints which are free from loosely-adhering colouring matter and are faster to rubbing.

The new products may be manufactured by interacting an aromatic carboxylic halide with a p-aminoarylamide of 2,3-hydroxynaphthoic acid or by interacting a monoaroyl-p-arylenediamine with a halide of a 2,3-hydroxynaphthoic acid. The compounds to be interacted must be free of solubilizing groups (the carboxylic acid and sulfonic acid groups) as already mentioned. The carboxylic halides may be prepared in situ from the carboxylic acids and, say, phosphorus trichloride.

The following examples in which parts are by weight illustrate but do not limit the invention:

Example 1

This describes the manufacture of benzoyl-p-aminoanilide - 2,3 - hydroxynaphthoic acid. 21.2 parts of N-benzoyl-p-phenylenediamine, which is described by Hubner (Annalen, 1881, 208, 295), together with 19.7 parts of 2,3-hydroxynaphthoic acid are agitated with 200 parts of toluene at 60° C. 5.5 parts of phosphorus trichloride are added and the whole boiled gently under reflux until evolution of hydrogen chloride ceases. On cooling, the product is filtered off and free from traces of acid by washing with water containing sodium carbonate. It has melting point 281° C.

Example 2

This describes another way of manufacturing the product of Example 1. 13.9 parts of 2,3-hydroxynaphthoic-p-aminoanilide (M. P. 221°) together with 6.5 parts of benzoyl chloride are added to 120 parts of toluene and the whole boiled gently under reflux until evolution of hydrogen chloride ceases. On cooling, the insoluble product is filtered off, washed with a little benzene and dried. It has melting point 281° C. and is identical with the product made by the first method.

Example 3

2 parts of the compound obtained in Example 2 are pasted with 9 parts of Turkey red oil and 4 parts of caustic soda (62° Twad.) and the paste dissolved by addition of 40 parts of boiling water. The solution is then bulked to 1000 parts with water, when it is clear yellowish orange in colour.

Cotton is steeped in the above solution for half an hour at 25-30°, the ratio of liquor to cotton being 20 : 1 by weight. The exhaustion is 50% while the exhaustion of 2,3-hydroxynaphthoic-naphthylamine (the most highly substantive of the commercial arylamides of 2,3-hydroxynaphthoic acid is only 39%).

Example 4

The cotton treated as in Example 2 is wrung and then developed by immersion in a diazo solution in the known manner. The following table shows the colors obtained when various diazo components are used as diazo salts:—

| Base | Shade |
| --- | --- |
| 2,5-dichloroaniline | Scarlet. |
| 3-chloroaniline | Yellowish scarlet. |
| 5-nitro-o-toluidine | Yellowish red. |
| 4-chloro-o-nitroaniline | Red. |
| 3-nitro-p-toluidine | Do. |
| 5-chloro-o-toluidine | Do. |
| 4-chloro-o-anisidine | Bluish-red. |
| 5-nitro-o-anisidine | Claret. |
| 3-nitro-p-anisidine | Bluish claret. |
| o-phenetole-azo-naphthylamine | Deep navy blue. |

Example 5

2,3 - hydroxynaphthoic - 2'-chloro-4'-benzoyl-aminoanilide is prepared by the methods exemplified above. It has M. P. 280°–281° C. When applied to cotton at a 20:1 ratio of liquor to cotton as in Example 3, the exhaustion is 60%. The following table shows the colors obtainable when various diazo components are used in the form of their diazonium salts:—

| Base | Shade |
| --- | --- |
| 2,5-dichloroaniline | Scarlet. |
| 3-chloroaniline | Do. |
| 3-nitro-4-toluidine | Red. |
| 4-chloro-2-nitroaniline | Yellowish red. |
| 4-nitro-2-anisidine | Red. |
| 5-nitro-2-toluidine | Brick red. |
| 5-nitro-2-anisidine | Dull red. |
| 3-nitro-4-anisidine | Red. |

Example 6

2,3-hydroxynaphthoic-2'-methyl-5'-chloro-4'-benzoyl-aminoanilide prepared as indicated above has M. P. 268° C. When applied to cotton at a 20:1 liquor-cotton ratio as in Example 3, the exhaustion is 40%. The following table shows the shades obtained using a variety of different diazo components:—

| Base | Shade |
| --- | --- |
| 2,5-dichloroaniline | Scarlet. |
| 4-chloro-2-toluidine | Red. |
| 4-nitro-2-anisidine | Yellowish red. |
| 3-nitro-4-toluidine | Bluish red. |
| 4-chloro-2-nitroaniline | Dull red. |
| 5-nitro-2-toluidine | Dull bluish red. |
| 5-nitro-2-anisidine | Dull claret. |
| 3-nitro-4-anisidine | Do. |
| 2,5-diethoxy-4-benzoylamino-aniline | Blue. |

Example 7

2,3-hydroxynaphthoic-2'-methyl-4'-benzoyl-aminoanilide prepared as illustrated above has M. P. 254° C. When applied to cotton at a 20:1 ratio of liquor-cotton as in Example 3, the exhaustion is 45%. The following table shows the shades obtained when various diazo components are used in the form of their diazonium salts:—

| Base | Shade |
| --- | --- |
| 3-chloroaniline | Scarlet. |
| 2,5-dichloroaniline | Do. |
| 4-chloro-2-toluidine | Bluish scarlet. |
| 5-chloro-o-toluidine | Red. |
| 4-nitro-2-anisidine | Dull red. |
| 4-chloro-2-nitroaniline | Brick red. |
| 3-nitro-4-toluidine | Dull bluish red. |
| 4-chloro-2-anisidine | Do. |
| 5-nitro-2-toluidine | Claret. |
| 3-nitro-4-anisidine | Bordeaux. |
| 5-nitro-2-anisidine | Do. |
| 2,5-diethoxy-4-benzoylamino-aniline | Reddish blue. |

Example 8

2,3 - hydroxynaphthoic - 2' - methyl-4'-(p-anisoylamino) anilide prepared as indicated above has M. P. 230° C. When applied to cotton at 20:1 ratio of liquor-cotton as in Example 3, the exhaustion is 50%. The following table shows the shades obtained when different coupling components are used in the form of their diazonium salts:—

| Base | Shade |
| --- | --- |
| 3-chloroaniline | Dull yellowish scarlet. |
| 2,5-dichloroaniline | Do. |
| 4-chloro-2-toluidine | Yellowish red. |
| 4-nitro-2-anisidine | Do. |
| 5-chloro-2-toluidine | Dull brick red. |
| 5-nitro-2-toluidine | Brick red. |
| 4-chloro-2-nitroaniline | Do. |
| 3-nitro-4-toluidine | Dull yellowish red. |
| 3-nitro-4-anisidine | Claret. |
| 5-nitro-2-anisidine | Do. |
| 2,5-diethoxy-4-benzoylamino-aniline | Reddish blue. |

In practicing the invention in the preferred form there is selected a primary arylamine containing one or more n-auxochromes substituted for hydrogen of the aryl nucleus. The n-auxochromes are, specifically, the organic radicals alkyl, alkoxy, aryloxy, aralkyl, aralkoxy, aryl, hydro-aryloxy, trifluoro-alkyl, halogen, and nitro. Arylamines containing s-auxochromes are unsatisfactory, if the reaction products are to be used for the production of water-insoluble azo dyes. The s-auxochromes are the carboxylic and sulfonic acid groups.

The class of primary arylamines may be diazotized and coupled to the intermediates of my invention. The following list includes examples from this class, but it is to be understood that this list is exemplary, not limiting.

4-nitro-2-amino-anisole; 2,5-dichlor-aniline; 4-chloro-2-amino-toluene; 2-methoxy-1-naphthylamine; 2-methoxy-aniline; 2-phenoxy-aniline; 2-ethoxy-aniline; 2-chlor-5-methyl-aniline; 2-methyl-aniline; 2-methoxy-5-methyl-aniline; 2-methoxy-4-chlor-5-methyl-aniline; 2,5-dimethoxy-aniline; 2,5-diethoxy-aniline; 2,5-dimethoxy-4-chlor-aniline; 5-brom-2-methoxy-aniline; 3-iodo-6-methoxy-aniline; 3-iodo-6-ethoxy-aniline; 3-methyl-4-chlor-aniline; 3-brom-6-ethoxy-aniline; 3-chlor-6-ethoxy-aniline; 3-ethoxy-aniline; 3-phenoxy-aniline; 3-methoxy-aniline; 3-brom-6-phenoxy-aniline; 3-iodo-6-phenoxy-aniline; 3-brom-6-methyl-aniline; 3-chlor-6-methyl-aniline; 3-methyl-aniline; 3-brom-5-methyl-aniline; 3-chlor-6-phenoxy-aniline; 2,5-dimethyl-4-chlor-aniline; 4-ethyl-aniline; 4-amino-benzotrifluoride; 4-chlor-2-methoxy-aniline; 4-brom-2-methoxy-aniline; 4-iodo-2-methoxy-aniline; 4-methoxy-aniline; 4-chlor-2-ethoxy-aniline; 4-phenoxy-aniline; 4-ethoxy-aniline; 4-brom-2-phenoxy-aniline; 4-methoxy-2-chlor-aniline; 4-chlor-2-methyl-aniline; 4-methyl-3-brom-aniline; 4-brom-3-methyl-aniline; 4 - methyl - 3 - chlor-aniline; 4 - methyl-aniline; 4-chlor-2-phenoxy-aniline; 4-methoxy-3-chlor-aniline; 4-phenoxy-2-chlor-aniline; 4-chlor-2,5-diethoxy-aniline; 3-chlor-2-methyl - aniline; 3 - chlor - 2 - methoxy-aniline; alpha - naphthylamine; beta - naphthylamine; ortho-chlor-aniline; meta-chlor-aniline; meta-nitraniline; 4-chloro-2-nitraniline; 4-chloro-2-amino-anisole; 5 - nitro - 2 - amino-anisole; 1 - amino-4-benzoylamino-2,5-diethoxy-benzene; N-(para-amino - benzoyl) - aniline; dianisidine; alpha-amino-anthraquinone; 3-amino-carbazole; 2-nitro-4-methyl-benzene-azo-cresidine; 4-4'-diamino-diphenylamine.

Among the advantages of the invention are the manufacture and use of new compositions of matter, of new intermediates for azo dyestuffs, and of new azo dyestuffs which have qualities superior to prior art dyestuffs, in that they have higher affinity for those substances which are dyed by direct cotton dyes, and which exhaust uniformly and more completely than prior art dyestuffs.

As many apparently widely different embodiments of this invention may be made without departing from the spirit and scope thereof, it is to be understood that I do not limit myself to the specific embodiments thereof except as defined in the appended claims.

I claim:

1. A dyestuff being the product of coupling 2,3-hydroxy-naphthoic-2'-chloro-4'-benzoylaminoanilide with a diazotized arylamine.

2. A dyestuff being the product of coupling 2,3-hydroxy-naphthoic-2'-methyl-5'-chloro-4'-benzoylaminoanilide with a diazotized arylamine.

3. A dyestuff being the product of coupling a diazotized arylamine with a compound of the formula

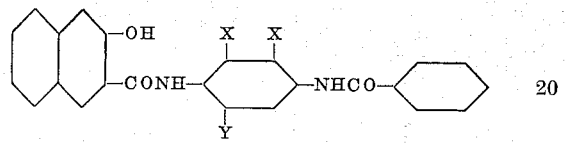

in which one X represents chlorine, the other X represents hydrogen, and Y represents one of a group consisting of hydrogen and methyl.

WILFRED ARCHIBALD SEXTON.